Nov. 28, 1950
M. H. SHAMOS ET AL  
INTERFERENCE REDUCING METHOD  
OF SECRET COMMUNICATION
2,531,951
Filed Aug. 2, 1944
2 Sheets-Sheet 2
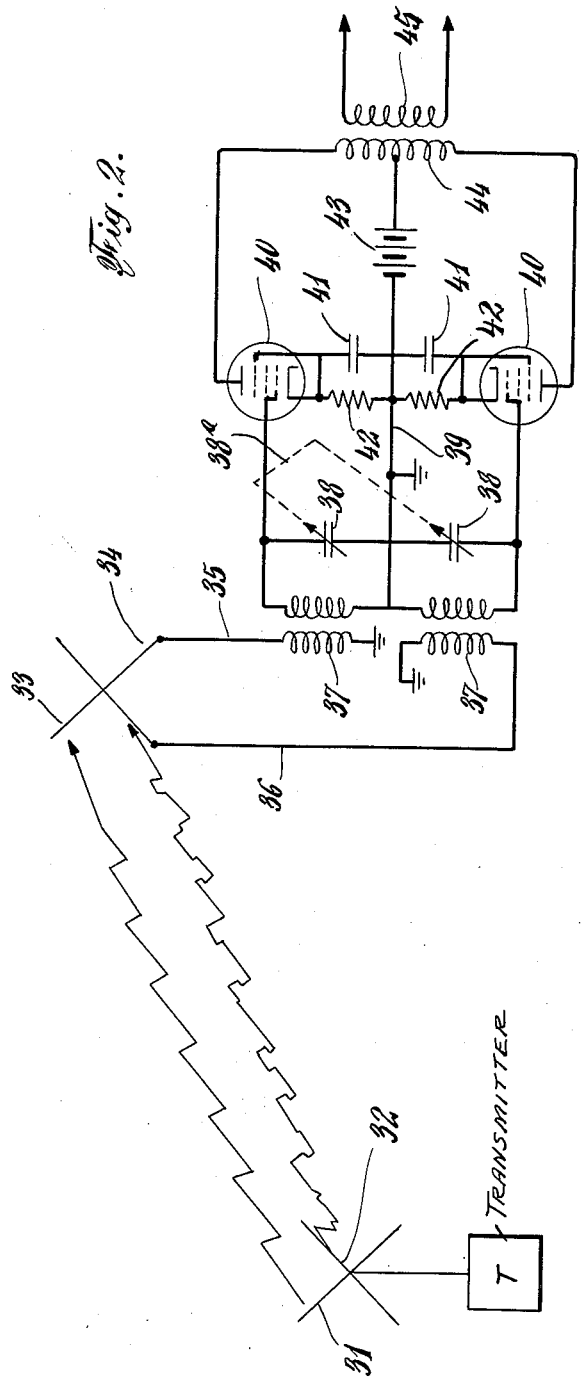
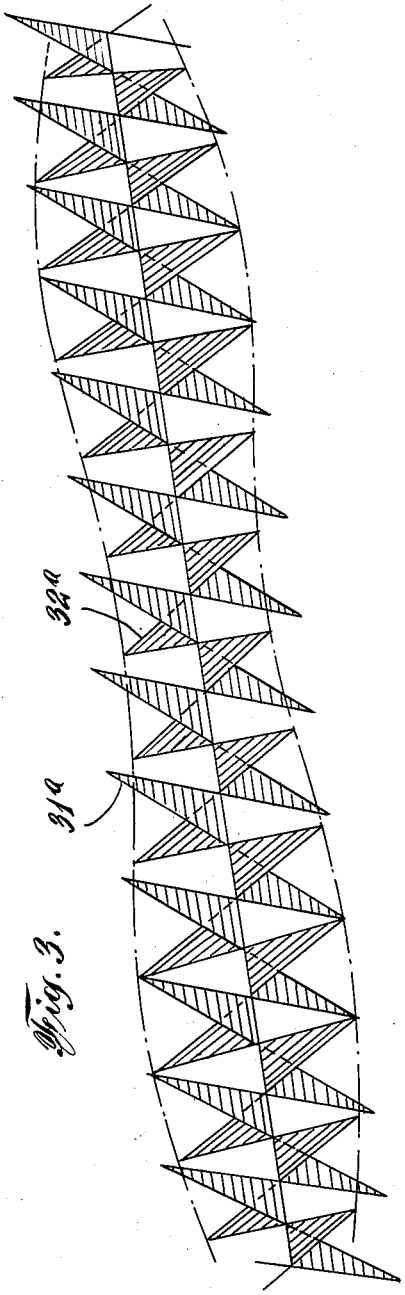
INVENTORS.  
Morris H. Shamos  
BY  Irving S. Lowen
William F. Nickel  
ATTORNEY Patented Nov. 28, 1950

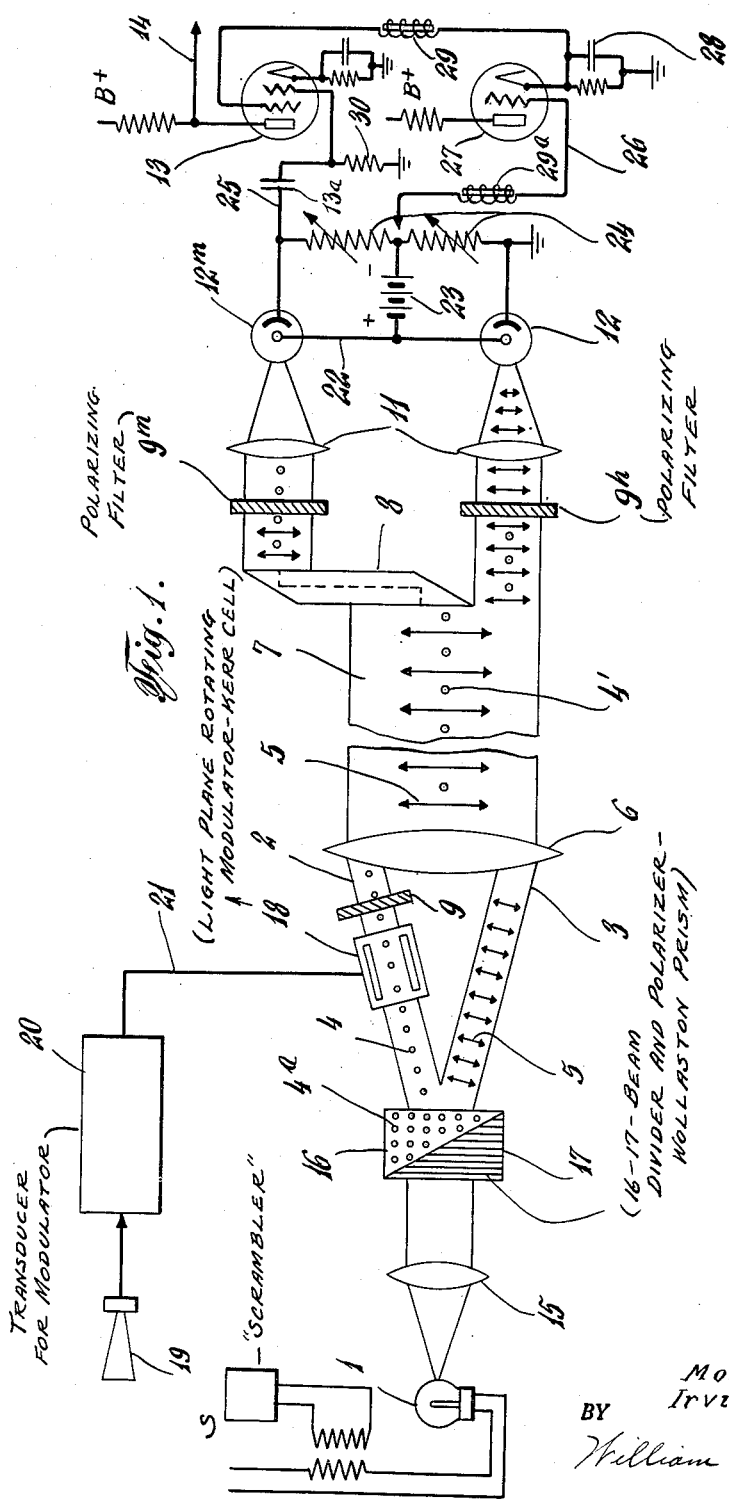

2,531,951

UNITED STATES PATENT OFFICE 2,531,951

INTERFERENCE REDUCING METHOD OF SECRET COMMUNICATION

Morris H. Shamos and Irving S. Lowen, New York, N. Y., assignors of one-half to W. I. Westervelt and G. C. Westervelt, both of New York, N. Y.

Application August 2, 1944, Serial No. 547,732

5 Claims. (Cl. 250—7)

We have invented a novel transmission system; and particularly a system for the transmission of intelligence by the radiation of energy in the form of either visible or invisible waves or oscillations.

In general, the main object of the invention is to provide an efficient, accurate and stable transmission system, the output of which cannot be affected by disturbances or changes in the state of the medium to be traversed between the place from which the intelligence is sent and the place where it is received; cannot be intercepted; and cannot be obstructed or prevented from reaching the receiver by "jamming."

Another object of the invention is to provide a transmission system with which intelligence can be sent by either visible or invisible light rays or radio oscillations of moderate or very high frequency, and with complete control of the direction and conditions of transmission.

A further object of the invention is to provide a system of transmission which can be used to full advantage when the transmitter apparatus or the receiver or both are in motion, without distortion or suppression by noise appearing at the receiver; as, for example, when either the transmitter or the receiver or both are carried by a moving object, such as a ship, a plane, or a vehicle moving along the earth's surface.

These and other objects and advantages of our invention will appear in the following description and all the characteristic features are pointed out in the appended claims. This disclosure, however, is illustrative only, and while the accompanying drawings show one or more embodiments of apparatus which are used, many changes may of course be made in the devices employed, the arrangement thereof, and the method of operation; without departure from the nature of the invention or the underlying principles of same.

On the drawings:

Figure 1 is an outline of one arrangement showing the devices and electric circuits containing said devices, for realizing our invention.

Figure 2 shows a modified embodiment of our invention; and

Figure 3 shows the general character of the wave energy utilized therewith.

On the drawings, the same numerals identify the same parts throughout.

In the use of the system exemplified in Figure 1, the energy for transmitting signals is obtained from light rays; but in fact any wave length between .000001 cm. and 0.1 cm. may be employed. The numeral 1 denotes a lamp of sufficiently high power, and light emitted therefrom is brought to a focus and then divided into a pair of beams 2 and 3. These beams are polarized; the beam 2 in a substantially vertical plane, for example, as indicated by dots 4; and the other in a substantially horizontal plane, as illustrated by the arrows 5. On one beam the signals are impressed by modulation; and the two beams are then combined again by a suitable lens or other optical arrangement 6, and are sent off in the form of a single composite beam 7. One component of this beam consists of light polarized in a substantially horizontal plane as before, as shown by the arrows 5, while the other, too, is still polarized in a vertical plane, as now manifested by the dots 4'. This is because modulation is effected by varying or rotating the plane of polarization of the beam 2 and then passing it through a polarizing element 9, before it is combined again with the beam 3. Only vertically polarized light emerges from the element 9, but the amplitude varies. The beam 7 thus consists of one horizontally polarized component 3 of constant amplitude, and another 2 polarized in a vertical plane with amplitude or intensity continuously changing according to the signals impressed upon it. These variations in amplitude can therefore be transformed into electrical impulses which faithfully reproduce the signals or intelligence as sent from the source.

When the composite beam arrives at the receiver it is again split or divided by directing part of it through a prism 8 of the rhomboid type, as indicated by the dashed line in Figure 1. Suitably arranged mirrors might also be employed for this purpose. One of these branches is passed through a polarizing element 9h, which is adapted to allow light polarizied in only a horizontal plane to emerge; and the other beam is sent through an element 9m (this element being of the substance known as "Polaroid") which gives passage to only the light polarized in a vertical plane. The signals are thus cut off by the filter element 9h, but emerge from the element 9m; because they consist of vertically polarized light and this light is of varying intensity because of the changes in amplitude. The light passing through the element 9h of course does not vary in amplitude of oscillation but is of constant intensity, the same as in the beam 3.

The two divided beams now are separately focussed by lenses 11 upon light-sensitive cells 12 and 12m; connected in suitable electric circuits which include a vacuum tube amplifier 13, the anode of which is joined by a conductor 14 to a loud speaker (not shown) or some other reproducing mechanism. The electric circuits are so arranged that light waves of any amplitude reaching the cells 12 and 12m will give rise to opposed electrical impulses; and when the light beams are of equal intensity, though polarized in different planes, such impulses will cancel themselves or "balance out." But when the intensity of the light reaching the cell 12m varies, the resultant electrical impulses will reproduce the intelligence at the loud speaker or other apparatus connected to the amplifying means 13.

We shall now set forth more particularly the apparatus for transmitting. Adjacent the lamp 1 is a lens 15 which is at the right focal distance from the lamp and directs the light in a single beam against a pair of prisms 16 and 17. These prisms are of quartz with top and bottom in the form of a triangle and they are assembled with the triangles in reverse position; and their longest sides in contact. This makes a single unit, oblong in shape. The quartz is first worked so that the optic axis of the prism 16 is vertical and that of the prism 17 is horizontal. This fact is indicated by the dots and lines 4a and 5a respectively. Thus, the two elements 16 and 17 are combined to produce the well-known Wollaston prism, which both divides the beam and polarizes the two branches thereof. All of the polarization is brought about in the part 17, but it is confined to two planes, one parallel and the other normal to the optic axis. There is no refraction in the part 17 but when the light thus polarized enters the part 16, the beam is split and the polarized beams are separated. The divided beams have unequal velocities and hence must travel in different directions. One beam issues as the vertically polarized beam 2 and the other as the horizontally polarized beam 3 already described.

The modulator 18 which impresses the signals on the beam 2 may be either a Kerr cell or an electromechanical device. The intelligence, the medium for which may be spoken words, or anything else perceptible by the human senses, is addressed to a mouthpiece or microphone 19 which, through the usual instrumentalities in a case 20, converts sound waves into electrical impulses upon metallic conductors. These impulses or oscillations are carried by way of a connection 21 to the modulator 18. Assuming the same to be a Kerr cell, consisting of a container with nitrobenzene and a pair of electrodes immersed therein and connected to be influenced by the incoming electrical oscillations, this cell operates in its well-known way to rotate the plane of polarization of the light passing through the cell. The electrodes appear in top edge view in Figure 1, and have the form of the usual flat plates parallel to the direction of the light beam, which passes between them. Hence, as one speaks into the mouthpiece at 19, there are changes of potential between the electrodes in the cell and rotation of the plane of polarization in greater or lesser degree follows. Of course, the planes of polarization can be other than vertical or horizontal, so long as they are separate and distinct.

The element 9 between the modulator 18 and the lens or lens arrangement 6 allows vertically polarized light to pass without diminution of intensity. No horizontally polarized light can go through, however; and light that is polarized in a plane rotated away from the vertical by the modulator 18 can get through with amplitude lessened. Hence, beyond the element 9, all the light of the beam 2 is still vertically polarized but is of varying amplitude according to the modulation.

The horizontally polarized oscillations of the beam 3 are of the same amplitude as at the source 1; and unless otherwise stated, this amplitude may be regarded as constant, as already described.

At the place of reception, after the two separated beams impinge upon the elements 12 and 12m, the electrical impulses thus created surge through a pair of local circuits comprising a conductor 22, a common battery 23 and a pair of electric resistances 24. The conductor 22 unites the light-sensitive cells 12m and 12 and the positive pole of the battery 23 is connected to this conductor. One of the resistances is connected to the cell 12 and the other to the cell 12m, and their opposite terminals are joined together. These resistances are adjustable, and the common terminal thereof is connected to the negative pole of the battery 23.

It will thus be apparent that if light waves of the same amplitude fall upon the two cells 12 and 12m, the cells having like characteristics, the resistances 24 being equal, then the impulses in the circuit of each cell will be equal and balance out. If one beam is modulated, the resultant electrical impulses in these local circuits will correspond to the variations in the energy of the incoming oscillations bearing the intelligence.

The output terminal of the cell 12m is connected by a conductor 25 to the control grid of the tetrode amplifier 13, the anode and cathode circuits of which are of the usual type. The resultant oscillations are thus amplified and conducted to the lead 14 to be reproduced by the loud speaker or other reproducing apparatus. To the common terminal of the resistances 24, a lead 26 is joined by a sliding contact; this lead being also connected to a vacuum tube amplifier 27 of the triode type. The circuits of the electrodes of this tube 27 are connected in the well-known way; and in the cathode of this tube, and of the amplifier 13 is a condenser of large capacity 28 to by-pass the signal variations and thus supply steady bias. The cathodes of the two tubes may be of the filament or the heater type; preferably the latter. From the cathode of the tube 27 a conductor runs to another grid in the amplifier 13; and to avoid signal interference a choke coil 29 is placed in the line of said conductor. A similar choke coil 29a is put in the line of the conductor 26. For the amplifier 13 the usual grid leak 30 is provided. Coupling condenser 13a is inserted in the lead 25 between the grid leak 30 and the terminal of the adjacent resistances 24 to isolate the tube 13 from the battery 23.

The function and purpose of the tube 27 is to maintain the effect of the amplifier 13 in case the signals arriving at the cell 12m are very weak and to compensate for any variation in the overall intensity of the source. Then the potential caused by the cell 12, due to the control beam impinging thereon is amplified by the tube 27. This amplified voltage is applied to the screen grid of the amplifier 13, raising the potential of this grid, so that the effect of the tube 13 remains constant. Thus, tube 27 and its associated circuits comprise, in effect, a means of automatic volume control.

A system of the kind above described will not be disturbed by variations in the state of the intervening medium, such as static, fog, smoke or other cause of fluctuation in the amount of light received and ordinarily appearing as noise in the receiver. Any such variations will affect the two polarized components equally, creating equal and opposed electrical impulses which eliminate one another beyond the cells 12 and 12m. Only the signal impulses produce oscillations in the receiving circuits which reach the devices beyond the amplifier 13.

Previous methods of static elimination in radio transmission consisted primarily in the transmission of two beams, one carrying the intelligence, the other being the control beam. However, these two beams were of different carrier frequencies, so as not to interfere with one another. Hence, the band width is widened and, since noise is proportional to band width, the amount of interference to be eliminated may become so great as to overshadow and suppress the intelligence—hence, no such balancing system can be effective. In our system, the frequency of the two polarized phases is the same, and the band width is limited by the modulation frequency; and the elimination is complete.

A system of this kind affords full security and secrecy because of the possibility of arbitrarily modulating the light at the source 1, as indicated at S on Figure 1. This modulation could be of any chosen type or pattern. It would affect both divided, polarized beams 2 and 3, be delivered to the light-sensitive cells 12 and 12m equally and be balanced out through the resistances 24; the same as any outside disturbances influencing both polarized components of the beam 7. But the signals impressed on one beam by the modulator 18 will go through without distortion, to create impulses in the receiver by which the intelligence is converted into perceptible form.

In consequence, an enemy observer attempting to intercept the beam with ordinary photophone apparatus will get a signal so masked by noise that the information will be unintelligible. Furthermore, this system has the important advantage that no knowledge of the nature of the "scrambling" procedure at the source is required by the operator at the receiver. Thus, the "scrambling" need not be systematic, but may be entirely random. The usual security systems employed in radio and adapted to photophone transmission, have two defects; first, the operator at the receiver, as well as the operator at the transmitter, must be informed of the "scrambling" procedure; and second, the "scrambling," being systematic for at least short intervals of time, is thereby capable of being deciphered. In addition, our invention makes it unnecessary to employ complex filter circuits.

Our system affords the additional advantage over ordinary photophone systems, of being useful in places where either the transmitter and/or the receiver are in motion; such as between ship and shore, ship and ship, ship and plane, plane and plane, plane and ground, or vehicle upon the ground. In ordinary systems without control beams, relative motion between the transmitter and receiver causes variations in received intensity which result in noise capable of masking the intelligence; but in our system such noise is eliminated, provided of course the rotation of the beams is not such as to bring about complete cut-off.

Figure 2 illustrates apparatus by which radio oscillations of moderate or high frequencies can be utilized to give the same results as above set forth. The transmitter is outlined at T and comprises two antennae members 31 and 32. The carrier wave is polarized in one plane and propagated from member 31 (inclined at 45°) of an antenna; and another wave of the same frequency is polarized in a plane at right angles to the first and sent out from the member 32 of said antenna, also inclined at 45° in the opposite direction, and at right angles to the member 31. The two polarized components of the beam are thus forwarded together. At the receiver they are picked up by similarly inclined antenna members 33 and 34, at right angles to each other, and delivered to suitable mixing circuits where all the oscillations are balanced out except the signal impulses, which reproduce the signals and render them intelligible.

The antenna members 33 and 34 are separately grounded through conductors 35 and 36. In the line of each conductor is the primary winding of a transformer 37, commonly known as the antenna coil. The secondaries of these transformers have a common terminal; and across each secondary, commonly known as the radio frequency coil, is connected a tuning condenser 38. The opposite terminals of the secondaries of the transformer are attached by wires to the control grids of a pair of pentode amplifiers 40, with both screen and suppressor grids. The common terminal of the secondaries is joined by a wire 39, having a suitable ground tap, to the negative pole of a common plate battery 43 for the amplifiers 40. The positive pole of this battery is joined to the midpoint of a transformer primary coil 44, the opposite terminals of which lead as shown to the anodes or plates of the amplifiers 40. The transformer secondary coil 45 leads to the reproducer of the intelligence. The cathodes of the tube 40 are preferably of the heater type, with by-pass condensers 41 and bias resistors 42 in circuit therewith, and joined to the conductor 39. The connections of the tubes 40, transformers, etc. need not be described in further detail, as they are arranged in the well-known way so that oscillations of equal frequency, amplitude and phase picked up by the antenna members 33 and 34 create impulses which are balanced out in the anode circuits of the tubes; while the intelligence modulations create unbalanced impulses which take effect in the reproducer circuit. The tuning condensers 38 are coupled mechancially, as indicated by member 38a, so as to provide tuning of both circuits simultaneously.

The antennas 31 and 32 polarize the waves in the respective planes of inclination, and they are inclined at 45° so that each will transmit its full equal share of disturbances creating noise at the receiver. Static is picked up at the transmitting antenna and imposed on the modulated carrier wave emitted therefrom. In the space between the transmitter, the waves are not influenced by any disturbances from which noise at the receiver might ensue. At the antennas 33 and 34 the incoming oscillations will include whatever comes from the transmitter, with disturbances at the site of the receiver added. All of these are divided between the antenna members 33 and 34 and opposed and eliminated in the tube circuits. But the modulations of the carrier wave are passed through to the secondary coil 45.

Figure 3 shows diagrammatically the combined carrier and intelligence oscillations in planes 90° apart. The control waves of constant amplitude, unless disturbed, are indicated at 31a, the modulated intelligence waves at 32a. They are propagated in all directions unless the frequency is very high or the antenna members are designed as directional.

If the antenna member 31 were vertical, the carrier or control beam would be polarized in a vertical plane and since any disturbances at the receiver might likewise be polarized mostly in the same plane, the disturbing oscillations would not be equally divided between the members 33 and 34 and no balancing out would follow. If necessary, the modulated beam and the control beam may be of different amplitude so as to provide a component of carrier frequency at the receiver for efficient detection.

So far as the transmitter is concerned, a single polarized wave modulated to carry the intelligence could be employed, and the separate control beam omitted. The intelligence would then be propagated as in ordinary radio transmission systems. But at the receiver, this wave would be subject to all the disturbances that give rise to the usual "site" noises; and these would not be eliminated in the receiver circuits. The arrangement of the antenna members of both the transmitter and receiver at the inclinations stated with each pair of antenna members at right angles to each other; and the propagation of the polarized control wave from one antenna member of the transmitter, and the intelligence in a separate, polarized beam from the other; followed by the separate reception of each on a correspondingly inclined antenna member; enable us to realize all of the benefits and advantages of our invention.

The system of Figure 2 is accurate and incapable of interception or "jamming." The circuits of the antenna members 31 and 32 are of the conventional kind, and may include means for modulating both beams, in addition to impressing the intelligence on one, as before. Such additional arbitrary modulation will balance out, as in the system of Figure 1, where modulation at the light source 1 as well as by the device 18, may be effected. Secrecy of transmission will be assured, because any one tuning in will receive only transmission effects that are noisy and unintelligible.

Our invention is very useful in the field of television; and because of its freedom from interference and disturbance of every sort, it can be employed to transmit pictures over considerable distances with only relay stations in between, and make the costly coaxial cable, with its casing filled with gas and transmitting conductor therein, entirely unnecessary.

Having described our invention, what we claim to be new is:

1. A method of transmitting intelligence consisting in creating light energy; dividing said energy into two separate beams and simultaneously polarizing each in separate planes; modulating one of said beams by rotating its plane of polarization, confining said beam thereafter to its original plane of polarization to vary the amplitude of the oscillations thereof according to the modulation, combining said beams and propagating same together as a composite beam, separating the polarized components thereof, and transforming the oscillations thereof into electrical impulses; opposing the impulses due to said components, and reproducing the intelligence from the resultant impulses.

2. A method of transmitting intelligence which consists in creating at a single source wave energy of higher frequency than visible light rays, dividing and modulating a portion of said energy, polarizing said portion in a definite plane between the place of transmission and a place of reception, polarizing the remainder of said energy between said places, receiving and collecting energy thus polarized, converting the polarized components of said energy into separate electrical impulses, opposing the impulses arising from said portion to the impulses due to said remainder, and from the resultant impulses reproducing said intelligence.

3. A method according to claim 1 including the step of arbitrarily modulating all said energy before dividing it, in addition to impressing the intelligence on one beam thereof, so as to mask said intelligence and prevent unauthorized reception.

4. A method according to claim 2 which comprises the step of arbitrarily modulating all said energy before propagation, in addition to modulating a portion thereof to prevent disclosure of said intelligence except through reception thereof as intended.

5. A method for transmitting intelligence which consists in creating wave energy at a single source, separating and modulating a portion of said energy, polarizing said portion so that the oscillations thereof are confined to a definite plane between the place of emission and a place of reception, polarizing the remainder of said energy so that the oscillations thereof are confined to a plane at an angle to said first-named plane between said places, emitting and propagating said portion and said remainder together to a receiver at said place of reception, converting the full energy of the oscillations of both said portion and said remainder into electrical impulses, opposing the impulses due to said portion to the oscillations caused by said remainder, and reproducing said intelligence from the resultant impulses, and further modulating alike in an arbitrary manner the portion carrying the intelligence and the remainder of said energy before emission, in addition to impressing the intelligence upon said portion, to prevent ascertainment of said intelligence if intercepted.

MORRIS H. SHAMOS.
IRVING S. LOWEN.

REFERENCES CITED

The following references are of record in the file of this patent:

UNITED STATES PATENTS

| Number | Name | Date |
|---|---|---|
| 891,339 | Hirt | June 23, 1908 |
| 1,746,829 | Goodrum | Feb. 11, 1930 |
| 1,770,497 | Schroter | July 15, 1930 |
| 1,807,602 | Radford et al. | June 2, 1931 |
| 1,870,465 | Rathbun | Aug. 9, 1932 |
| 1,997,628 | Chubb | Apr. 16, 1935 |
| 2,002,515 | Worrall | May 28, 1935 |
| 2,051,537 | Wolff et al. | Aug. 18, 1936 |
| 2,075,094 | Chubb | Mar. 30, 1937 |
| 2,100,348 | Nicolson | Nov. 30, 1937 |
| 2,198,233 | Snyder, Jr. | Apr. 23, 1940 |
| 2,312,093 | Hammond, Jr. | Feb. 23, 1943 |
| 2,357,439 | Usselman | Sept. 5, 1944 |

FOREIGN PATENTS

| Number | Country | Date |
|---|---|---|
| 582,007 | Germany | Aug. 7, 1933 |